United States Patent [19]

Behr et al.

[11] Patent Number: 4,951,963
[45] Date of Patent: Aug. 28, 1990

[54] SELF-ADJUSTING KNEE BOLSTER

[75] Inventors: Leonard W. Behr, Pontiac; Craig W. White, Grosse Pointe, both of Mich.

[73] Assignee: Automotive Systems Laboratory, Inc., Farmington Hills, Mich.

[21] Appl. No.: 415,720

[22] Filed: Oct. 2, 1989

[51] Int. Cl.⁵ .............................................. B60R 21/02
[52] U.S. Cl. ..................................... 280/753; 280/752
[58] Field of Search ........................ 280/751, 752, 753

[56] References Cited

U.S. PATENT DOCUMENTS

| | | | |
|---|---|---|---|
| 3,964,578 | 6/1976 | Campbell et al. | 280/752 |
| 4,099,743 | 7/1978 | Non | 280/753 |
| 4,198,075 | 4/1980 | Kob et al. | 280/753 |
| 4,434,999 | 3/1984 | Sato | 280/752 |
| 4,709,943 | 12/1987 | Yoshimura et al. | 280/752 |

Primary Examiner—Kenneth R. Rice
Attorney, Agent, or Firm—Lyon & Delevie

[57] ABSTRACT

A knee bolster for protecting the passengers of a motor vehicle comprises one or more deformable members positioned generally forward of each vehicle passenger; ultrasonic sensors for determining the position of the knees and tibiae of each passenger within the motor vehicle relative to the deformable members; and means responsive to the sensing means for articulating and translating each deformable member relative to the vehicle interior and, hence, relative to the knees and tibiae of each passenger corresponding thereto to provide optimum protection to the passengers in the event of a subsequent collision or marked vehicle deceleration.

13 Claims, 2 Drawing Sheets

SELF-ADJUSTING KNEE BOLSTER

BACKGROUND OF THE INVENTION

The instant invention relates generally to a motor vehicle's interior structure and the use thereof to mitigate injury to vehicle passengers upon collision or marked deceleration of the vehicle.

Known knee bolsters comprise deformable elements which are fixedly located about the passenger compartment of a vehicle so as to be positioned opposite the knee and tibia of each vehicle passenger when the passenger is normally seated in the vehicle. See, e.g., U.S. Pat. No. 3,947,056 issued March 30, 1976 to Schwanz. Upon a collision or marked deceleration of the vehicle, such knee bolsters collapse in a controlled manner to absorb a portion of the kinetic energy of the vehicle passenger to slow same, thereby reducing the severity of passenger injuries sustained during the event.

Significantly, the position and angle of such fixed knee bolsters in relation to the knees and tibiae of each passenger at the time of collision or marked vehicle deceleration have a major effect of the stresses applied to the limbs of the passenger and, hence, the potential for injury. Since such fixed knee bolsters are optimized for passengers of average size, the protection afforded by such knee bolsters becomes increasingly unavailing to passengers whose size deviates from the norm. For example, a 5th percentile female will typically slide under the knee bolster, while a 95th percentile male is likely to suffer substantial injury from knee contact with irregularly shaped dashboard contours and/or vehicular controls situated above the knee bolster. Moreover, such fixed knee bolsters fail to accommodate even an average-sized passenger (1) when the passenger places his feet so as to cause the angle formed between the surface of the knee bolster and either of his tibiae to deviate from the ideal angle to be formed therebetween; (2) when the passenger shifts either of his legs to cause the spacing between the surface of the knee bolster and his tibiae to deviate from the ideal spacing therebetween; or (3) when the passenger shifts his legs so as to raise either of his knees above the knee bolster.

The prior art further teaches the use of knee bolsters in conjunction with an active passenger restraint, such as an air bag, to further restrict the passenger's movement relative to such other restraint, such as to prevent the "submarining" of the passenger beneath the air bag during a crash condition. In this manner, the effectiveness of the active restraint in preventing the serious injury to vehicle passengers is significantly increased. Such auxiliary knee bolsters typically comprise a secondary air bag deployable to engage the knees of the vehicle occupant prior to, or simultaneous with, deployment of the primary (torso) bag. See, e.g., U.S. Pat. No. 3,768,830 issued Oct. 30, 1973 to Hass, teaching a secondary air bag deployed to engage the knees of the vehicle occupant prior to deployment of the primary air bag; and U.S. Pat. No. 3,767,225 issued Oct. 23, 1973 to Mazelsky, teaching a knee bolster comprising a bag-within-a-bag positioned opposite the knees of the vehicle occupants and inflated simultaneously therewith. Alternatively, U.S. Pat. No. 4,198,075 issued April 15, 1980 to Kob et al. teaches a deformable knee impact plate which is pivotally deployed into a position near the knees of the passenger as by an air bag or belt tensioner upon the detection of a crash condition by suitable sensor means. Unfortunately, as with the fixed knee bolsters discussed hereinabove, such auxiliary knee bolsters are optimized for passengers of average size and present similarly increased likelihood of passenger injury when the passengers legs are shifted from their ideal position relative to the knee bolster prior to the deployment thereof upon the detection of a crash condition.

What is needed is a self-adjusting knee bolster whose position within the vehicle relative to the knees and tibiae of a passenger therein continuously adjusts to provide the passenger optimum protection against injury in the event of a subsequent collision or marked vehicle deceleration.

SUMMARY OF THE INVENTION

It is an object of the instant invention to provide a knee bolster for a motor vehicle which adjusts its position relative to the knees and tibiae of vehicle passengers prior to the detection of a vehicle collision or marked vehicle deceleration, whereby passengers of varying size are each afforded optimal protection against injury during such collision or marked vehicle deceleration.

It is also an object of the instant invention to provide a knee bolster for a motor vehicle which periodically adjusts its position relative to the knees and tibiae of vehicle passengers prior to the detection of a vehicle collision or marked vehicle deceleration, whereby passengers are afforded optimal protection against injury during such collision or marked vehicle deceleration notwithstanding periodic shifting of the position of their legs relative to the vehicle's interior.

Another object of the instant invention is to provide a knee bolster whose position within a motor vehicle is periodically adjusted so as to (1) maintain its operative surface in a substantially parallel relationship with, and at a substantially constant distance from, the tibia of a passenger's leg; and (2) maintain a portion of its operative surface at a height within the vehicle above the passenger's knee.

The instant knee bolster comprises one or more deformable, force-absorbing members forming interior surfaces of the motor vehicle generally forward of the passenger when he is normally seated therein; means for sensing the position of the passenger's knees and tibiae relative to the deformable members, respectively; and means responsive to the passenger sensing means for articulating and translating each deformable member relative to a fixed point on the motor vehicle so as to adjust its position relative to the passenger's knees and tibiae in order to minimize passenger injury in the event of a subsequent vehicle collision or marked vehicle deceleration. More specifically, under the instant invention, the position of each deformable member is preferably periodically adjusted by the articulating and translating means so as to place its operative surface in a substantially parallel relationship with one of the passenger's tibiae at a substantially constant distance therefrom notwithstanding periodic shifting by the passenger of the position of his leg(s) within the vehicle.

The means for articulating and translating the deformable member relative to a fixed point on the vehicle and, hence, relative to the vehicle passenger to be protected therewith comprises one or more actuators extending between the deformable member and a rigid support therefor on the vehicle. In a first embodiment, the actuators are operated pneumatically. In a second embodiment, one or more motorized leadscrews or worm drives extend between the deformable member and rigid vehicle structures to support and adjust the position of the former within the vehicle.

In accordance with another feature of the instant invention, the means for articulating and translating the deformable member provides for the raising and lowering the deformable member relative to other fixed structures within the vehicle, e.g., the vehicle dashboard, and, hence, the knee of the passenger to be protected therewith. For example, in a preferred embodiment, the means for articulating and translating the deformable member further comprises a rigid frame supported by the actuators. The frame has a first track thereon which is in interlocking engagement with a second, complementary track on the deformable member. A rack-and-pinion or worm drive operates to displace the deformable member relative to the frame along the tracks thereof, whereby the optimal vertical positioning of the deformable element relative to the knee of the passenger is readily prescribed.

Where desired, the knee bolster of the instant invention further comprises a vehicle ignition sensor for determining the operative condition of the vehicle. The articulating and translating means responds to the ignition sensor to move the deformable member away from the passenger's legs to facilitate ingress and egress from the vehicle. Additionally, the instant invention contemplates signal means responsive to the passenger sensing means for providing an audible or visual warning when the passenger assumes a position within the vehicle likely to result in increased injury in the event of a subsequent collision or marked deceleration of the vehicle.

BRIEF DESCRIPTION OF THE DRAWINGS

In the drawings, wherein like reference numerals are employed to designate identical components among the various embodiments.

DETAILED DESCRIPTION OF THE PREFERRED EMBODIMENTS OF THE INVENTION

Figure 1:
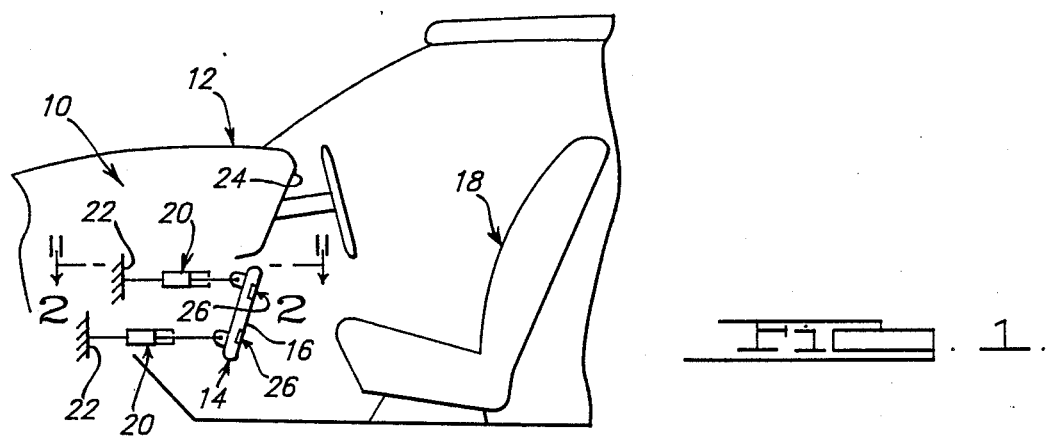
FIG. 1 is a schematic, partial side elevational view of a passenger motor vehicle incorporating pneumatically-actuated knee bolsters in accordance with the instant invention.
Figure 2:
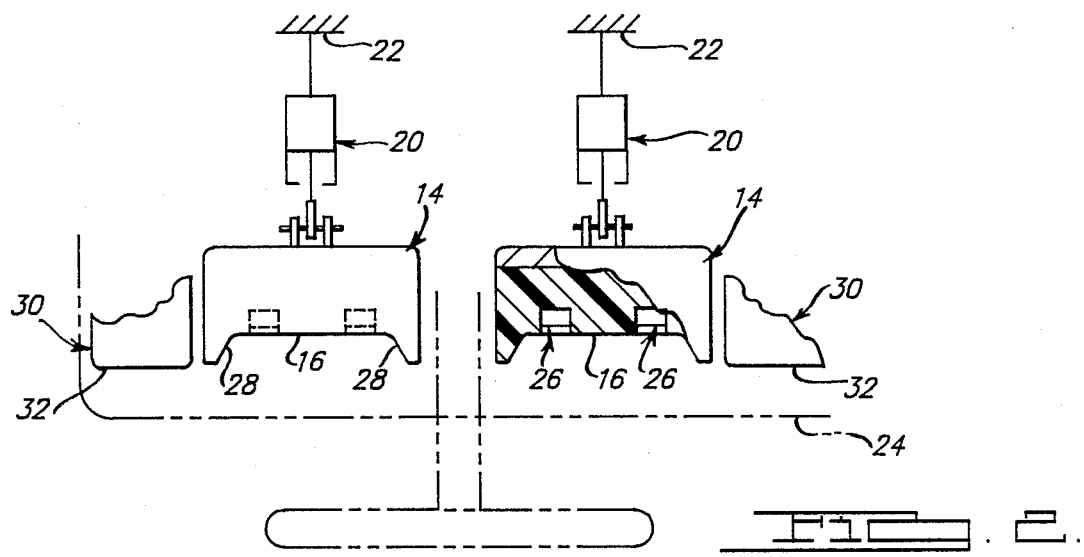
FIG. 2 is a schematic, partial top view of the knee bolsters shown in FIG. 1 along line 2—2 thereof.

A first exemplary embodiment 10 of the instant knee bolster for protecting a passenger (not shown) of a motor vehicle 12 against injury in the event of a subsequent collision or marked deceleration of the vehicle 12 is shown schematically in FIGS. 1 and 2. The knee bolster 10 generally comprises a deformable, energy-absorbing member 14 forming an interior surface 16 of the vehicle 12 generally forward of the passenger when he is normally seated on passenger seat 18 therein. The deformable member 14 is supported by pneumatic actuators 20, such as air bladders controlled by suitable sources of pressurized air, extending between the deformable member 14 and rigid supports 22 therefor on the vehicle 12. The pneumatic actuators 20 permit the articulation and substantially horizontal translation of the deformable member 14 relative to other fixed structures within the vehicle, such as the dashboard 24 and seats 18 therein, and, hence, relative to the knees and tibiae of the passenger seated within the vehicle 12.

An array of sensors 26 comprising, for example, ultrasonic transmitters and detectors is imbedded in the surface 16 of each deformable member 14. The sensors 26 detect the separational distance between the surface 16 of each deformable member 14 and the upper and lower portions of the tibia of the passenger's leg in opposition therewith. The sensors 26 further detect the relative position of the passenger's knees within the vehicle 12 with respect to the surfaces 16 of each deformable member 14, for the purpose to be more fully described hereinbelow. The sensors 26 provide controlling inputs to the actuators 20, whereupon the actuators 20 position the deformable members 14 within the vehicle 12 so as to achieve the optimal separational distance between the deformable members 14 and the passenger's tibiae notwithstanding periodic movement of the passenger's legs within the vehicle 12 during the normal operation thereof.

The optimal separational distance between the surface 16 of the deformable member 14 and the tibiae of the passenger is presently thought to be about 10 cm, with the surface 16 of the deformable member 14 being maintained in a substantially parallel relationship with the passenger's tibia. For example, empirical evidence suggests that ankle injuries are likely to result from a spacing greater than 10 cm due to the ankle rotation allowed thereby.

It is noted that, under the instant invention, the deformation experienced by the deformable member 14 during a collision or marked vehicle deceleration can be either of an elastic or plastic nature, or both. The operative surface 16 of each deformable member 14 is preferably provided with a plurality of projections 28 which serve to guide the passenger's knee and tibia thereinto during a collision or marked vehicle deceleration, in the manner known to those skilled in the art. Vehicle structures 30 defining other interior surfaces 32 within the vehicle proximate with the deformable members 14 serve to restrain the movement of the deformable members 14 upon the impingement of the passenger's legs thereupon during a collision or marked vehicle deceleration. Additionally, such proximate interior surfaces 32 may themselves be comprised of force-absorbing materials to provide an additional measure of protection to a passenger whose position within the vehicle is such that the deformable member 14 cannot be articulated and/or translated by the actuators 20 so as to be placed in its optimal position relative to the passenger's leg.

In accordance with another feature of the instant invention, a signal lamp (not shown) is illuminated when the sensors 26 determine that the passenger has assumed a position within the vehicle 12 likely to result in increased injury in the event of a subsequent collision or marked deceleration of the vehicle. The passenger is thus warned that he has assumed a position involving greater risk of injury should an accident occur, and the passenger is afforded the opportunity to reposition himself within the vehicle 12 prior to the occurrence of a collision or marked vehicle deceleration.

It is further noted that the pneumatic actuators 20 shown in FIGS. 1 and 2 may further serve to absorb a portion of the passenger's kinetic energy during a collision or marked vehicle deceleration. Moreover, a control module (not shown) for the pneumatic actuators 20 may further act to vary the spring rate and damping characteristics thereof as by adjusting the rate of air being bled from the actuators 20 during a crash event, whereby the passengers are afforded even greater protection against bodily injury.

Figure 3:
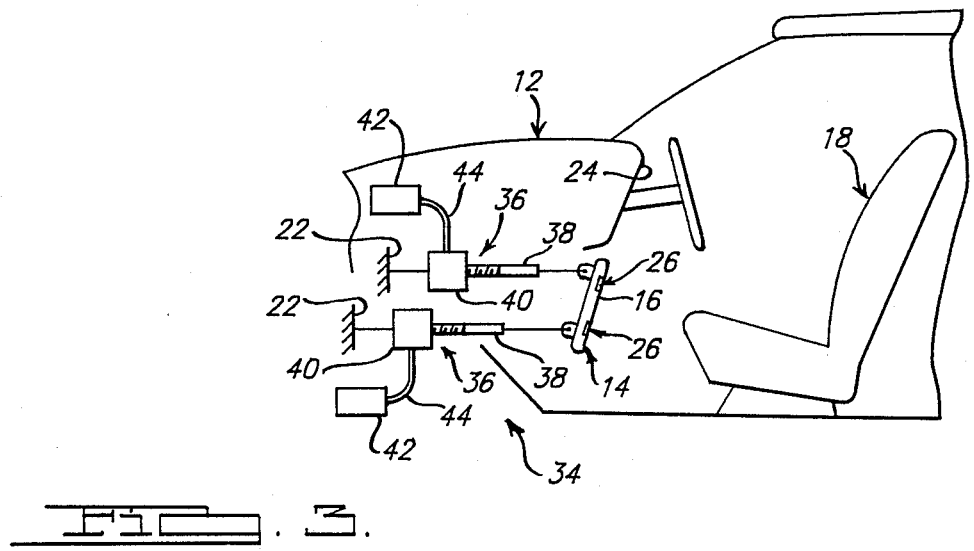
FIG. 3 is a schematic, partial side elevational view of a motor vehicle incorporating leadscrew-actuated knee bolsters in accordance with the instant invention.

In the alternate embodiment 34 of the instant knee bolster illustrated in FIG. 3, the pneumatic actuators 20 of the first embodiment 10 are replaced with actuators 36 comprising a pair of leadscrews 38 pivotally connected with the deformable member 14; a pair of gearnuts 40 mounted on rigid vehicle support 22 and engageable with the leadscrews 38, respectively; and a pair of motors 42 mounted on the vehicle 12 that are responsive to the sensors 26 and operative to selectively turn the gearnuts 40 via flexible shafts 44. Such "worm drives" and suitable control circuits therefor are well known in the art, e.g., for use in articulated seats and, as such, are not further described herein.

Figure 4:
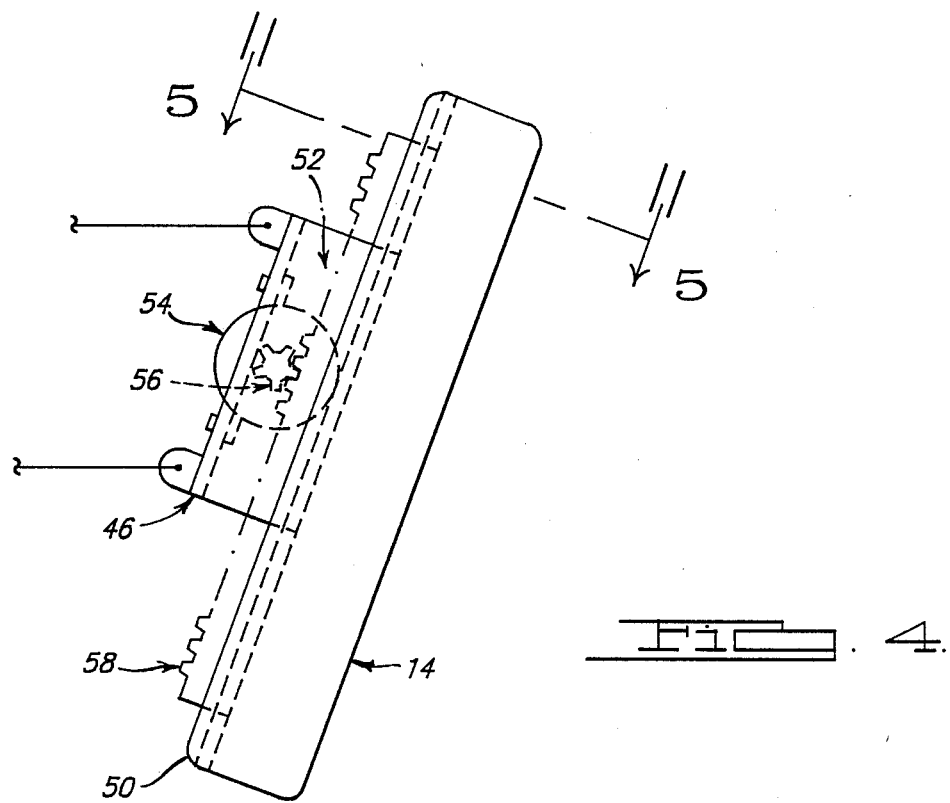
FIG. 4 is an isolated side view in elevation of a deformable member supported by an articulated frame via complementary, interlocking tracks and employing a rack-and-pinion drive to enable vertical adjustment of the deformable member relative to the vehicle interior and, hence, the knee and tibia of a passenger's leg to be protected therewith.
Figure 5:
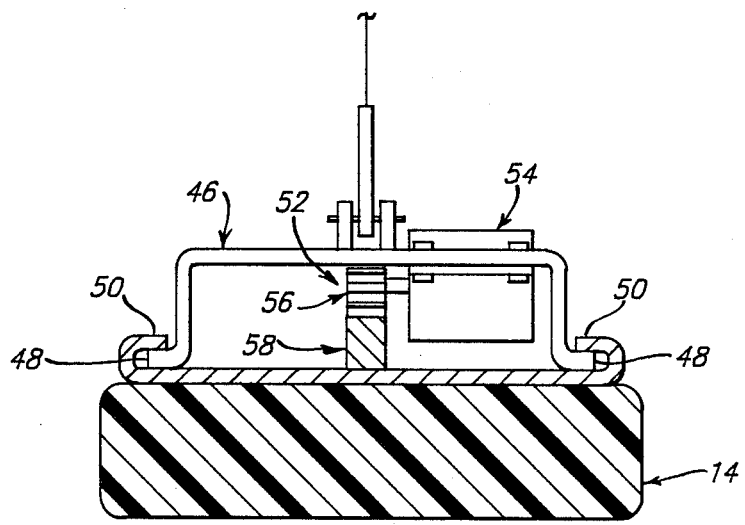
FIG. 5 is a cross-sectional view of the deformable member and its supporting frame along line 5—5 of FIG. 4.

FIGS. 4 and 5 are isolated views of a deformable member 14 supported by a rigid, articulated frame 46. Specifically, the frame 46 is supported by, and articulated and horizontally translated relative to a fixed point on the vehicle by, a suitable number of pneumatic actuators 20 or worm-drives 36. A pair of complementary, interlocking guide rails or tracks 48 and 50 are provided on the frame 46 and the deformable member 14, respectively, to permit the generally vertical displacement of the deformable member 14 relative to the frame 46. Precise vertical displacement of the deformable member 14 relative to the frame 46 is obtained with a motor-driven rack-and-pinion gear train 52 comprising a motor 54 mounted on the frame 46 which operates to turn a pinion gear 56 engaging a rack gear 58 mounted on the deformable member 14. The gear train 52 operates under the control of the sensors 26 so as to maintain a portion of the operative surface 16 of each deformable member 14 at a height within the vehicle 12 above the passenger's knee to be protected therewith. In this manner, the instant knee bolster ensures the protection of those passengers whose size deviates from the norm or whose leg movements would otherwise render the protection afforded by known fixed knee bolsters unavailing.

In accordance with another feature of the instant invention, a vehicle ignition sensor (not shown) determines the operative condition of the vehicle. The pneumatic actuators 20/worm drives 36 and verticalpositioning motor 54 respond to the ignition sensor to move the deformable member 14 away from the passenger's legs to facilitate ingress and egress from the vehicle 12.

While the preferred embodiment of the invention has been disclosed, it should be appreciated that the invention is susceptible of modification without departing from the spirit of the invention or the scope of the subjoined claims. For example, the instant invention contemplates the use of sensors for detecting the passenger's weight, the position of the passenger's seat, the location of the passenger's feet on the floor of the vehicle, etc., as may be required in order to optimally deploy the deformable member of the instant knee bolster prior to a collision or marked vehicle deceleration. Similarly, suitable transducers may be employed to monitor the instantaneous position of the deformable member within the vehicle relative to the rigid supports therefor, as through the use of Hall-effect transducers in combination with the worm drives shown in FIGS. 3 and 5, thereby permitting the installation of the sensors on fixed structures within the vehicle rather than imbedding them in the surface of the deformable member, as described hereinabove.

We claim:

1. A safety device for protecting a passenger of a motor vehicle comprising
    a deformable, force-absorbing member forming an interior surface of said motor vehicle generally forward of said passenger when said passenger is normally seated in said motor vehicle;
    means for sensing the position of said passenger relative to said deformable member; and
    means responsive to said passenger sensing means for articulating and translating said deformable member relative to a fixed point on said motor vehicle so as to position said deformable member relative to said passenger to minimize injury to said passenger in the event of a subsequent collision or marked vehicle deceleration.

2. The safety device of claim 1 wherein said means for articulating and translating said deformable member comprises an actuator extending between said deformable member and a rigid support therefor on said motor vehicle.

3. The safety device of claim Z wherein said actuator is operated pneumatically.

4. The safety device of claim 2 wherein said actuator comprises
    a leadscrew;
    a gearnut mounted on said motor vehicle and engageable with said leadscrew; and
    a motor operative to turn said gearnut, whereby said leadscrew is advanced in said gearnut upon operation of said motor.

5. The safety device of claim 2 wherein said means for articulation and translating said deformable member further comprises
    a frame supported by said actuator; and means on said frame for supporting said deformable member with respect thereto.

6. The safety device of claim 5 wherein said means on said frame for supporting said deformable member comprises
    a first track on said frame;
    a second track on said deformable element complementary with the first track on said frame and in interlocking engagement therewith; and
    means operative to displace said deformable element relative to said frame along the first track thereof.

7. The safety device of claim 6 wherein said means operative to displace said deformable element relative to said frame along the first track thereof comprises
    a rack-and-pinion gear train; and
    a motor operative to turn said pinion gear of said gear train.

8. The safety device of claim 1 including vehicle ignition sensing means for determining the operative condition of said motor vehicle; and wherein said articulating and translating means responds to said ignition sensing means to move said deformable member away from said passenger to facilitate ingress and egress from said vehicle.

9. The safety device of claim 1 wherein said passenger sensing means comprises an ultrasonic transmitter and an ultrasonic detector.

10. The safety device of claim 1 including signal means responsive to said passenger sensing means for warning said passenger when said passenger assumes a position within said vehicle likely to result in increased injury to said passenger in the event of a subsequent collision or marked deceleration of said motor vehicle.

11. A knee bolster for protecting the tibia and knee of a passenger of a motor vehicle against injury in the event of rapid deceleration of said motor vehicle relative to said passenger comprising a deformable, energy-absorbing member forming an interior surface of said motor vehicle generally forward of said passenger when said passenger is normally seated in said motor vehicle;

means for sensing the position of said passenger relative to said deformable member: and means responsive to said sensing means for adjusting the position of said deformable member relative to said passenger prior to the rapid deceleration of said motor vehicle relative to said passenger.

12. The knee bolster of claim 11 wherein the position of said deformable member relative to said passenger is adjusted by said position adjusting means to maintain a surface of said deformable member in a substantially parallel relationship with, and at a substantially constant distance from, the tibia of said passenger.

13. The knee bolster of claim 12 wherein the position of said deformable member relative to said passenger is adjusted by said position adjusting means to maintain a portion of the surface of said deformable member at a height within the vehicle above the knee of said passenger.

* * * * *